(12) United States Patent
Mamba et al.

(10) Patent No.: US 9,285,931 B2
(45) Date of Patent: Mar. 15, 2016

(54) DISPLAY DEVICE

(75) Inventors: Norio Mamba, Kawasaki (JP); Tsutomu Furuhashi, Yokohama (JP); Kouichi Anno, Chiba (JP)

(73) Assignees: Japan Display Inc., Tokyo (JP); Panasonic Liquid Crystal Display Co., Ltd., Himeji-shi (JP)

( * ) Notice: Subject to any disclaimer, the term of this patent is extended or adjusted under 35 U.S.C. 154(b) by 1794 days.

(21) Appl. No.: 12/423,042

(22) Filed: Apr. 14, 2009

(65) Prior Publication Data

US 2009/0256821 A1  Oct. 15, 2009

(30) Foreign Application Priority Data

Apr. 15, 2008  (JP) ................................. 2008-105617

(51) Int. Cl.
  *G06F 3/045*  (2006.01)
  *G06F 3/044*  (2006.01)

(52) U.S. Cl.
  CPC ...................................... *G06F 3/044* (2013.01)

(58) Field of Classification Search
  CPC ....................................................... G06F 3/044
  USPC .................................. 345/174, 173
  See application file for complete search history.

(56) References Cited

U.S. PATENT DOCUMENTS

| | | | |
|---|---|---|---|
| 4,087,625 A | 5/1978 | Dym et al. | |
| 5,432,671 A * | 7/1995 | Allavena | 361/280 |
| 5,945,980 A * | 8/1999 | Moissev et al. | 345/173 |
| 6,002,389 A * | 12/1999 | Kasser | G06F 3/041 178/18.01 |
| 7,030,860 B1 * | 4/2006 | Hsu | G06F 3/044 178/18.06 |
| 7,358,741 B2 | 4/2008 | Sato et al. | |
| 7,724,243 B2 * | 5/2010 | Geaghan | 345/173 |
| 2003/0071784 A1 * | 4/2003 | Sato et al. | 345/156 |
| 2007/0229464 A1 * | 10/2007 | Hotelling et al. | 345/173 |
| 2007/0257894 A1 * | 11/2007 | Philipp | G06F 3/044 345/173 |
| 2008/0309633 A1 * | 12/2008 | Hotelling et al. | 345/173 |
| 2009/0213090 A1 * | 8/2009 | Mamba et al. | 345/174 |
| 2010/0271330 A1 | 10/2010 | Philipp | |

FOREIGN PATENT DOCUMENTS

| | | |
|---|---|---|
| JP | 53-84420 | 7/1978 |
| JP | 8-507396 | 8/1996 |
| JP | 2002-156644 | 5/2002 |
| JP | 2003-511799 | 3/2003 |
| JP | 2005-337773 | 12/2005 |
| JP | 2006-007061 | 1/2006 |
| JP | 2006-029987 | 2/2006 |

(Continued)

*Primary Examiner* — Nicholas Lee
*Assistant Examiner* — James M Holland
(74) *Attorney, Agent, or Firm* — Typha IP LLC

(57) ABSTRACT

The electrostatic capacity coupling type touch panel includes X electrodes (XP) and Y electrodes (YP) which intersect each other via a first insulating layer, and a plurality of Z electrodes in floating states to each other via a second insulating layer. For the second insulating layer, a material which changes in thickness by pressing of touch is used. The Z electrode is disposed so as to overlap both an X electrode and a Y electrode which are adjacent to each other. In a pad part of the X electrode, an area is larger toward the center of the X electrode and an area is smaller toward the center of the adjacent X electrode. Therefore, the nonconductive input means can be used, and highly accurate position detection is realized with a small number of electrodes even when a touch area is small.

13 Claims, 14 Drawing Sheets

(56) References Cited

FOREIGN PATENT DOCUMENTS

| JP | 2006-293482 | 10/2006 |
| JP | 2006-344163 | 12/2006 |
| JP | 2007-280101 | 10/2007 |
| JP | 2007-299409 | 11/2007 |
| WO | WO 94/14112 | 6/1994 |

* cited by examiner

CONTACT SURFACE
POSITION : XA

CONTACT SURFACE
POSITION : XB

CONTACT SURFACE
POSITION : XC

CONTACT SURFACE
POSITION:YA

CONTACT SURFACE
POSITION:YB

CONTACT SURFACE
POSITION:YC

DISPLAY DEVICE

CROSS-REFERENCE TO RELATED APPLICATION

The present application claims priority from Japanese application JP 2008-105617 filed on Apr. 15, 2008, the content of which is hereby incorporated by reference into this application.

BACKGROUND OF THE INVENTION

1. Field of the Invention

The present invention relates to a display device including the input device, and more particularly, to a display device which includes an input device of a capacity coupling type and which is suitable for achieving high coordinate detection accuracy.

2. Description of the Related Art

A display device including an input device (hereinafter, also referred to as "touch sensor" or "touch panel") having an on-screen input function for inputting information to a display screen by a touch operation (contact and press operation, hereinafter, simply referred to as "touch") with a user's finger or the like is used for a mobile electronic device such as a PDA or a mobile terminal, various home electric appliances, a stationary customer guiding terminal such as an automatic reception machine, and the like. It is know as the input device using the touch that there are a resistive film method of detecting a change in resistance value of a touched part, an electrostatic capacity coupling method of detecting a change in capacitance thereof, an optical sensor method of detecting a change in quantity of light at the part shielded by the touch, and the like.

The electrostatic capacity coupling method has the following advantages, compared with the resistive film method or the optical sensor method. For example, the electrostatic capacity coupling method is advantageous in that, the transmittance of the resistive film method or the optical sensor method is low about 80%, however a transmittance of the electrostatic capacity coupling method is as high as about 90%, that mean it prevents a reduction in displayed image quality. In the resistive film method, a touch position is detected by mechanical contact of the resistive film, leading to possible deterioration or breakage of the resistive film. However, in the electrostatic capacity coupling method, there is no mechanical contact such as contact of a detection electrode with another electrode. Thus, the electrostatic capacity coupling method is more advantageous in durability.

An exemplary touch panel using electrostatic capacity coupling method is disclosed in JP 2003-511799 A. In the method disclosed therein, a vertical detection electrode (X electrode) and a horizontal detection electrode (Y electrode) are arranged in vertical and horizontal two-dimensional matrix, and a capacity of each electrode is detected by an input processing unit. When a conductor such as a finger touches a surface of the touch panel, the capacity of each electrode increases. Thus, the input processing unit detects this capacity increase to calculate the input coordinates based on a signal of a capacity change detected by each electrode. Even when the detection electrode is deteriorated and the resistance value as physical characteristics is changed, its influence on capacity detection is limited. Thus, there is only a little influence on input position detection accuracy of the touch panel. As a result, high input position detection accuracy can be realized.

SUMMARY OF THE INVENTION

However, in the touch panel using the electrostatic capacity coupling method, as discussed in JP 2003-511799 A, the capacity change of each detection electrode is detected, and the input coordinates are detected. Hence, input means has to be made of a conductive material. Thus, when a stylus made of a nonconductive resin which is usually used by the resistive film method contacts with the touch panel using the electrostatic capacity coupling method, almost no capacity change occurs in the electrode. Thus, it cannot detect the input coordinates.

When a stylus is made of a conductive material such as a metal on the other hand, and an inputting operation is performed on the touch panel using the electrostatic capacity coupling method by the stylus, the number of electrodes increases. For example, it is assumed that an electrostatic capacity coupling type touch panel having a diagonal size of 4 inches and a vertical and horizontal size ratio of 3:4 is realized in an electrode shape based on a diamond shape of JP 2003-511799 A. When a finger is used as an input means, the minimum contact surface is supposed to have an area which has a diameter of 6 mm, and the total number of electrodes calculated to be 22 by using the diameter as a distance between the electrodes. On the other hand, if a contact surface of the stylus has a diameter of 1 mm, the total number of electrodes is calculated to be 139 by using the diameter as a distance between the electrodes, which is an increase of about six times. The increased number of electrodes causes an increase in frame area necessary for laying wiring lines in the input processing unit, and an increase in number of signal connections with a control circuit, consequently lowering reliability against shock and the like. A circuit area increases due to an increase in number of terminals of the input processing unit, which may be cause of a cost increase.

As apparent from the foregoing, in the electrostatic capacity coupling type touch panel discussed in JP 2003-511799 A, a reduction in number of electrodes in the case of using the input means which has a small contact area, and an input operation by using the nonconductive material are room of improvement.

In order to meet the above-mentioned room of improvement, the present invention uses an electrostatic capacity touch panel including: a plurality of X electrodes which extend in a first direction in a first plane, wherein each of the X electrodes is formed by thin line parts and pad parts which are alternately arranged in the first direction; a plurality of Y electrodes which extend in a second direction, which intersects the first direction, in a second plane, wherein each of the Y electrodes is formed by thin line parts and pad parts which are alternately arranged in the second direction; a plurality of Z electrodes which are in a third plane, and are electrically floating state each other; a first insulating layer which is located between the first plane and the second plane; and a second insulating layer which is located between the second plane and the third plane. In the electrostatic capacity touch panel, each of the plurality of X electrodes and each of the plurality of Y electrodes intersect each other via the first insulating layer; the pad part of the each of the plurality of X electrodes and the pad part of the each of the plurality of Y electrodes are disposed without overlapping each other in plan view; and each of the plurality of Z electrodes overlaps both an X electrode and a Y electrode which are adjacent to each other in plan view. Each of the plurality of Z electrodes is formed via a second insulating layer so as to overlap both an X electrode and a Y electrode which are adjacent to each other in plan view, and the plurality of Z electrodes are in electrically floating states to each other. Forming the second insulating layer of a material which changes in thickness by pressing force of touch, for example, an elastic insulating material, enables a capacity change between the each of the plurality of X electrodes and the each of the plurality of Y electrodes and the each of the plurality of Z electrodes even with the nonconductive input means. As a result, touch can be detected by the electrostatic capacity coupling method.

Further, the pad part of the each of the plurality of X electrodes extends to a vicinity of a thin line part of an X electrode adjacent to the each of the plurality of X electrodes. In plan view, in a shape of the pad part of the each of the plurality of X electrodes, an area is larger toward the thin line part of the X electrode and an area is smaller toward the thin line part of the adjacent X electrode. Thus, even when an electrode interval of the plurality of X electrodes is larger than a contact surface of a touch operation, touch coordinates can be calculated based on a ratio of detected capacity components of the adjacent X electrodes, enabling highly accurate position detection with a small number of electrodes.

Forming the plurality of Z electrodes by superimposing both the X electrode and the Y electrode which are adjacent to each other enables the adjacent Y electrode to detect a capacity change through the plurality of Z electrodes even when a contact surface is on an X electrode because of the touch, and the adjacent X electrode to detect a capacity change through the plurality of Z electrodes even when a contact surface is on a Y electrode because of the touch. Thus, the input coordinates can be detected on the entire touch panel surface. Simultaneously, the number of Y electrodes can be reduced.

According to the present invention, contriving shapes and an arrangement of the electrodes of the touch panel enables position detection with a smaller number of electrodes and with higher accuracy compared with the conventional case.

DETAILED DESCRIPTION OF THE INVENTION

Figure 1:
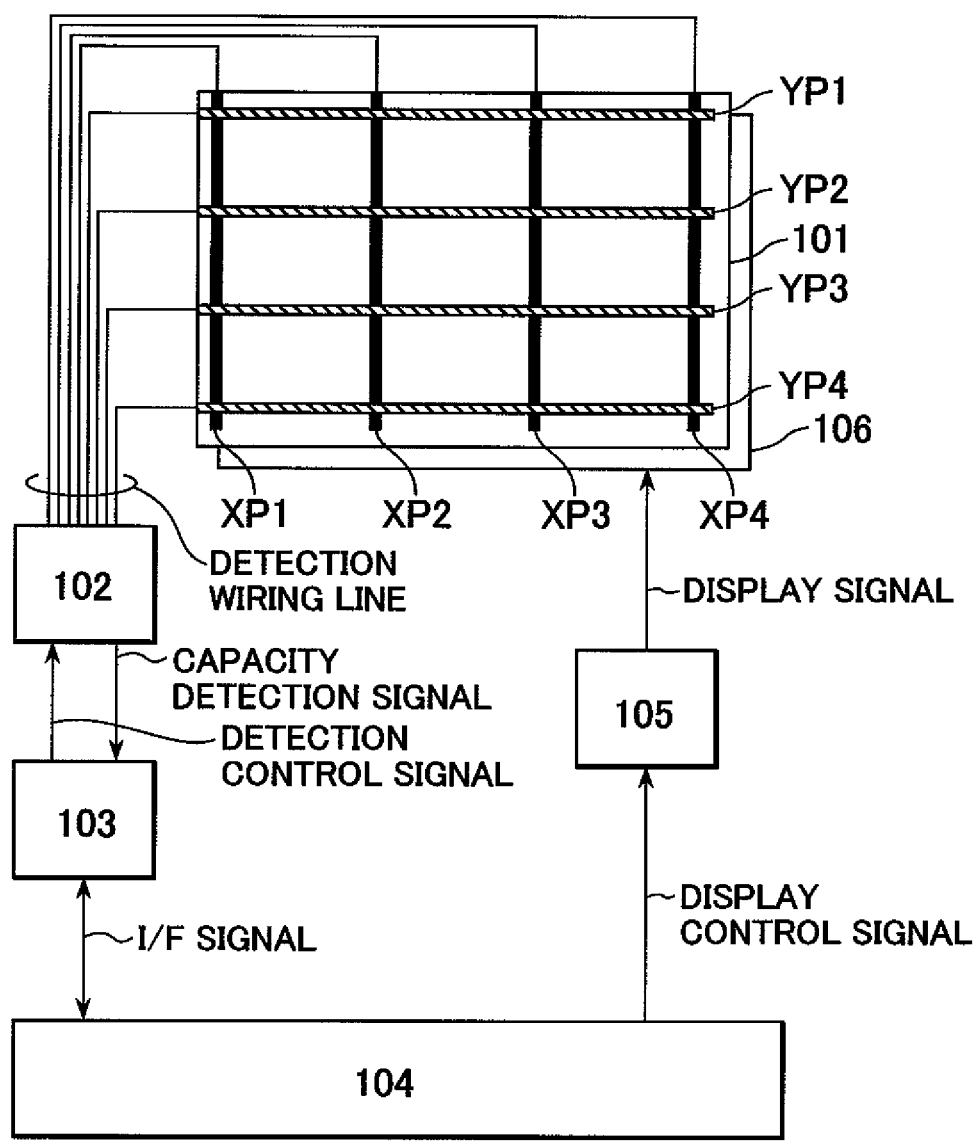
FIG. 1 illustrates a system configuration of an input device and a display device including the input device according to an embodiment of the present invention.

Referring to the drawings, a preferred embodiment of the present invention is described below in detail.

First Embodiment

FIG. 1 illustrates an input device (hereinafter, referred to as a touch panel) and a configuration of a display device including the input device.

In FIG. 1, a reference numeral 101 denotes a touch panel according to a first embodiment of the present invention. The touch panel 101 includes capacity detection X electrodes XP and Y electrodes YP. For example, four (XP1 to XP4) X electrodes and four (YP1 to YP4) Y electrodes are illustrated. However, the numbers of electrodes are not limited thereto. The touch panel 101 is installed in a front face of a display device 106. Thus, when a user watches an image displayed on the display device, a transmittance of the touch panel should preferably be high because the displayed image has to pass through the touch panel. The X and Y electrodes of the touch panel 101 are connected to a capacity detection unit 102 by detection wiring lines. The capacity detection unit 102 is controlled based on a detection control signal output from a control calculation unit 103 to detect a capacity of each electrode (each of X and Y electrodes) included in the touch panel, and to output a capacity detection signal changed depending on a capacity value of each electrode to the control calculation unit 103. The control calculation unit 103 calculates a signal component of each electrode from the capacity detection signal of each electrode, and calculates the input coordinates from the signal component of each electrode. A system 104 generates a display image according to the touch operation when the system 104 receives the input coordinates transferred from the touch panel 101 after the touch operation, and transfers the display image as a display control signal to a display control circuit 105. The display control circuit 105 generates a display signal according to the display image transferred as the display control signal, and displays an image on the display device.

Figure 2:
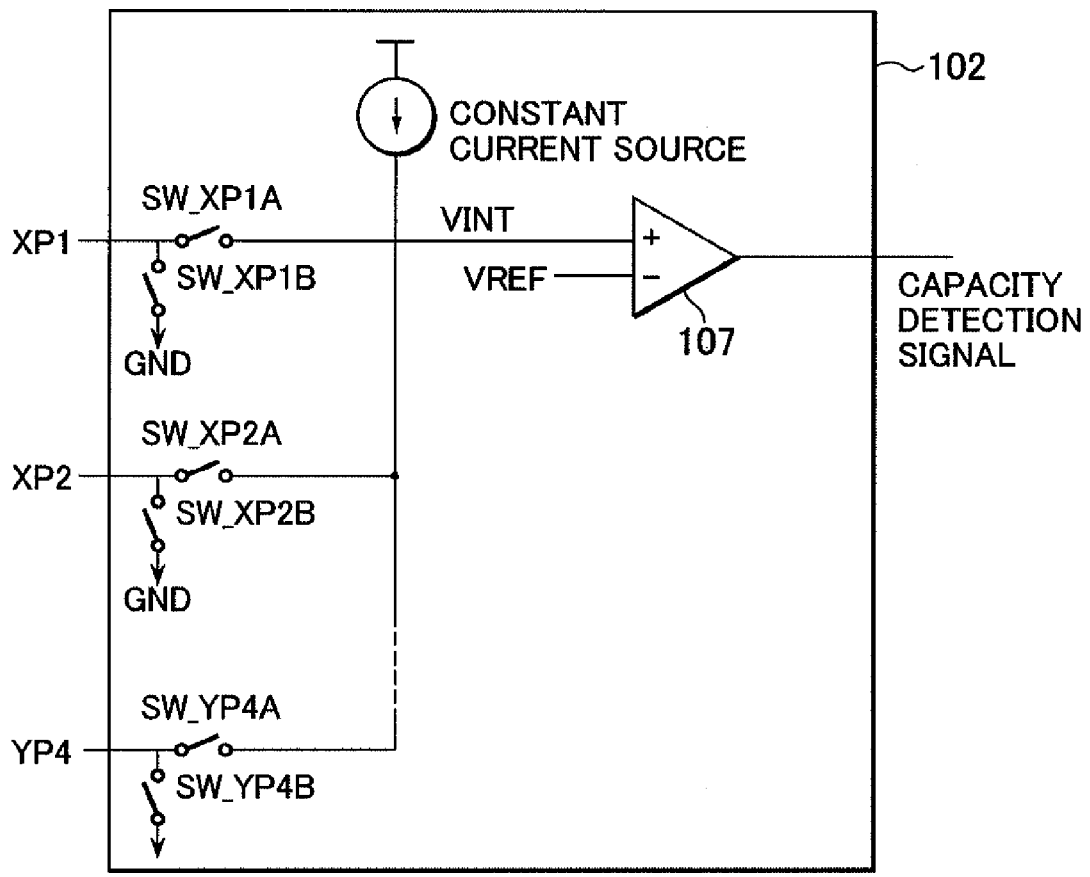
FIG. 2 illustrates a configuration of a circuit of a capacity detection unit 102.

FIG. 2 illustrates a configuration of a circuit of the capacity detection unit 102. Here, a capacity detection circuit using current integration is taken as an example. However, a capacity detection method is not limited to this example. Any system that is capable of detecting a capacity of the capacity detection electrode of the touch panel or a capacity change is applicable to the embodiment of the present invention, for example, a capacity detection method based on a switched capacitor using a switch and a capacity or a charged transfer method which transports charges to the capacity by using a switch and a capacity similarly. The capacity detection circuit of current integration illustrated in FIG. 2 includes a constant current source, switches SW_A for applying a current of the constant current source to the X and Y electrodes of the touch panel 101, a comparator 107 for comparing a voltage VINT of the capacity detection electrode during current integration with a reference voltage VREF, and switches SW_B for resetting a voltage of the capacity detection electrode. The switches SW_A and SW_B connected to the X electrodes XP and control signals thereof are denoted by SW_XPA and SW_XPB, respectively, and the switches SW_A and SW_B connected to the Y electrodes YP and control signals thereof are denoted by SW_YPA and SW_YBP, respectively.

Figure 3:
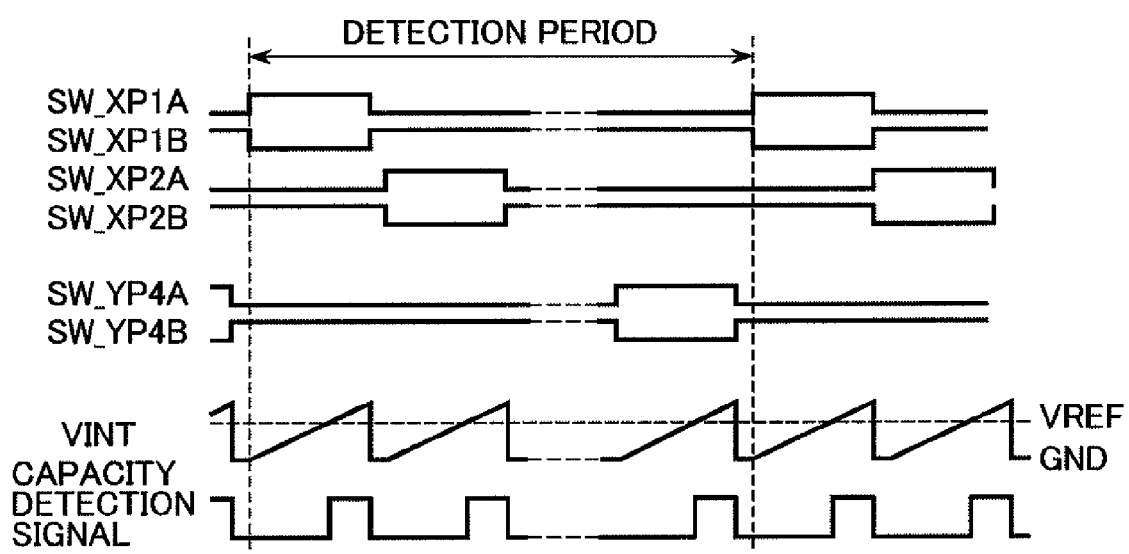
FIG. 3 is a timing chart illustrating an operation of the capacity detection unit 102.
Figure 4:
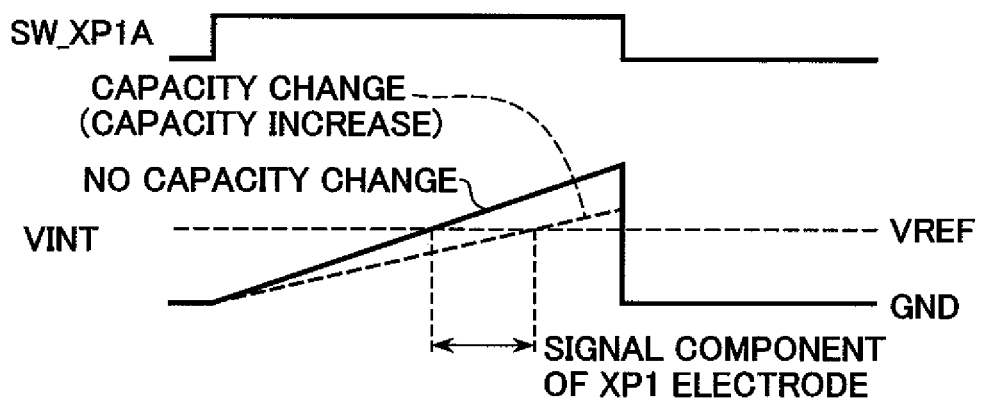
FIG. 4 illustrates a voltage waveform of a capacity detection electrode during capacity detection.

FIG. 3 is a timing chart illustrating an operation of the capacity detection unit 102 illustrated in FIG. 2. It is presumed that the switch is a connected state when a control signal is at a high level, and a disconnected state when the control signal is at a low level. The capacity detection unit 102 releases a reset state by setting the SW_XP1B to a low level, and interconnects the constant current source and the XP1 electrode by setting the SW_XP1A to a high level. The voltage VINT of the capacity detection electrode XP1 of the touch panel 101 accordingly increases. The reference voltage VREF is set to a higher potential than a reset potential (here, assumed to be GND). Thus, an output of the comparator 107 is kept at a low level in a period from when the SW_XP1A becomes a high level to when the VINT reaches the VREF. When the VINT reaches the reference voltage VREF or higher, the comparator 107 outputs a high level. Then, the comparator 107 outputs the high level until the SW_XP1A becomes a disconnected state and the SW_XP1B becomes a connected state to reset the XP1 electrode. When charging/discharging of the XP1 electrode as described above is completed, charging/discharging of the XP2 electrode is similarly carried out. This operation is repeated to detect capacities of the electrodes XP1 to XP4 and YP1 to YP4. Repeating this operation enables continuous detection of input coordinates. FIG. 4 illustrates a voltage VINT of the XP1 electrode when the change of the capacity of the capacity detection electrode of the touch panel 101 is detected by the capacity detection of current integration illustrated in FIGS. 2 and 3. If the XP1 electrode of the touch panel 101 is not touched, no change occurs in the capacity of the XP1 electrode, and thus a time period to reach the reference voltage VREF is almost constant among detection operations. On the other hand, if the XP1 electrode is touched, a change occurs in the capacity of the XP1 electrode. For example, assuming that the capacity increases, a time period to reach the reference voltage VREF is longer because a current of the constant current source is constant. The control calculation unit 103 can detect a difference in time period to reach the reference voltage VREF due to touch situations as a difference in rising timing of capacity detection signals. Thus, the control calculation unit 103 can calculate a difference in rising timing of the capacity detection signals as a signal component of each electrode, and calculate the input coordinates from the signal component of each electrode.

Figure 5A:
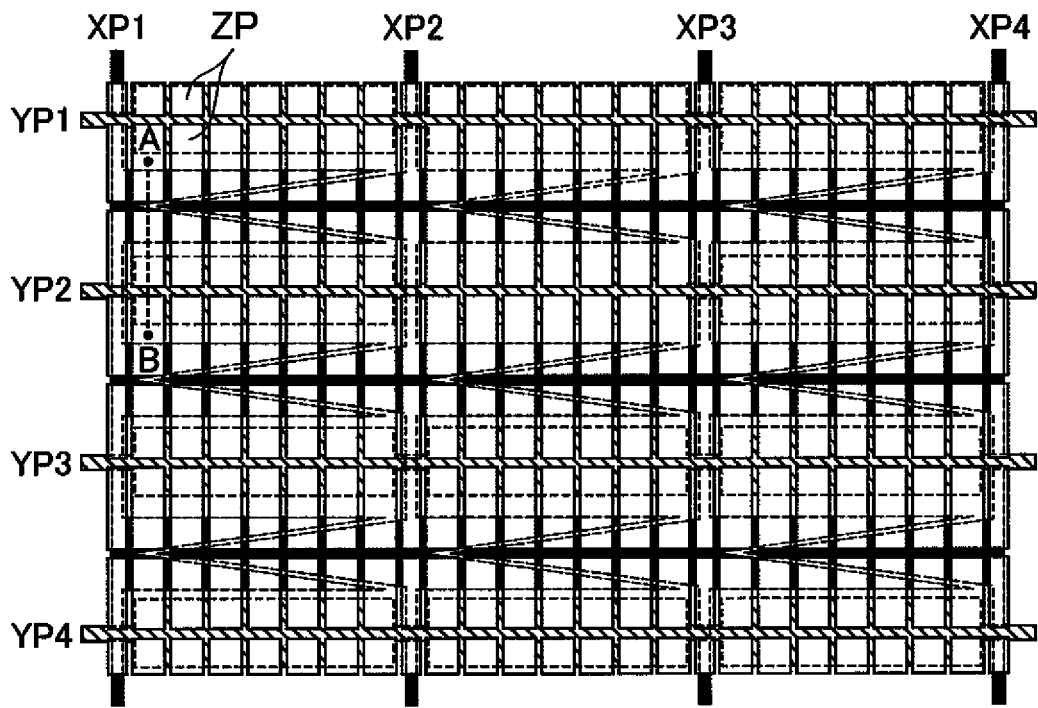
FIGS. 5A and 5B are plan diagrams each illustrating an electrode shape of a touch panel according to the embodiment of the present invention.
Figure 5B:
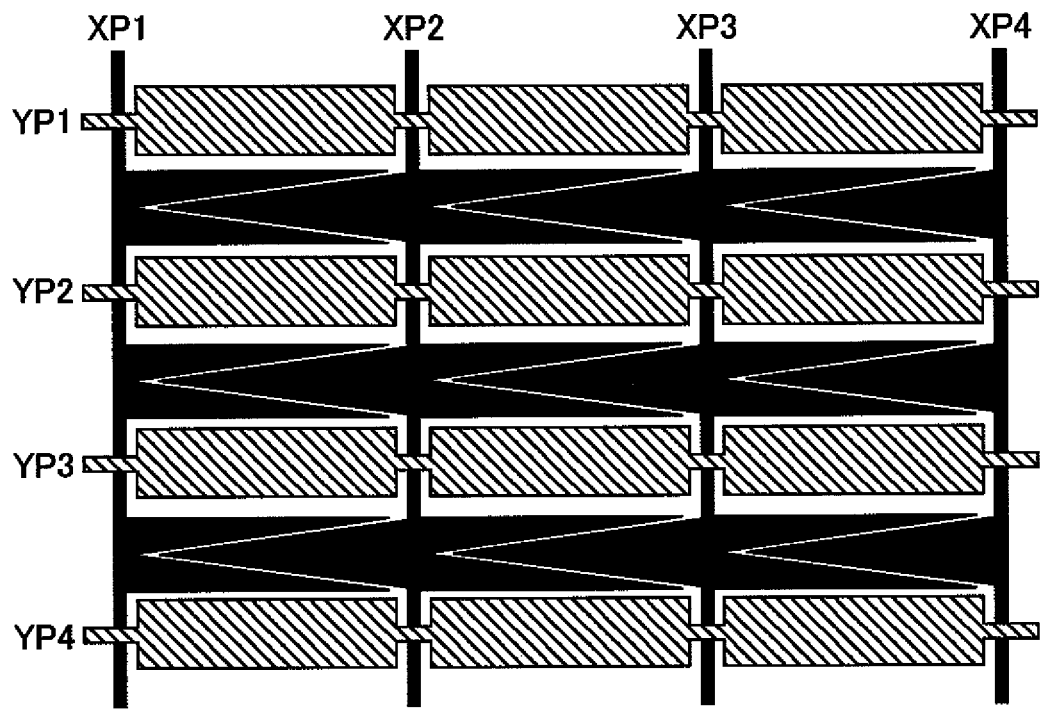
Figure 6:
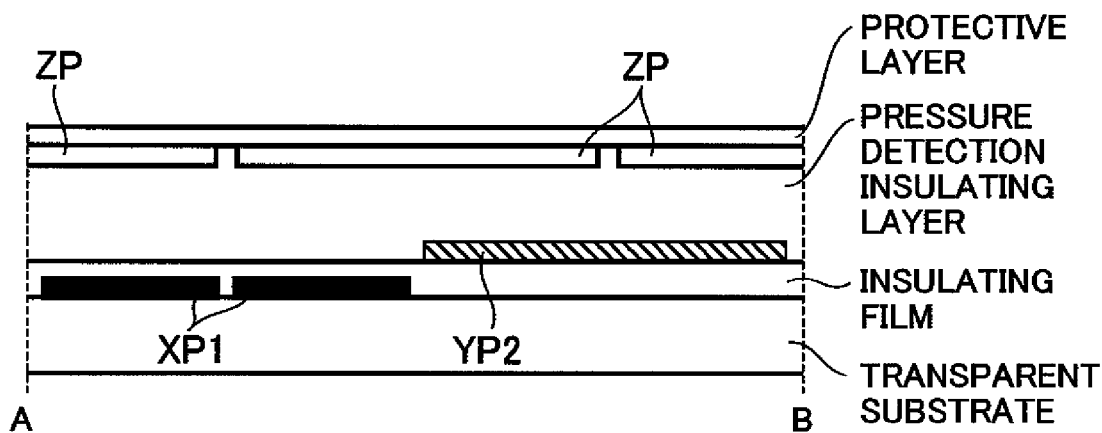
FIG. 6 is a sectional diagram illustrating an electrode structure of the touch panel according to the embodiment of the present invention.

Next, referring to FIGS. 5A and 5B and 6, the capacity detection electrodes disposed in the touch panel 101 of the first embodiment of the present invention are described.

FIG. 5A illustrates electrode patterns of the capacity detection X electrodes XP and Y electrodes YP of the touch panel 101, and Z electrodes ZP disposed thereon. The X electrodes XP and Y electrodes YP are connected to the capacity detection unit 102 by detection wiring lines. The Z electrodes ZP are not electrically connected and are in a floating state. FIG. 5B illustrates only the electrode patterns of the X electrodes XP and Y electrodes YP. The Y electrode extends in a horizontal direction of the touch panel 101, and a plurality of the Y electrodes are arranged in a vertical direction. At an intersection portion between the Y electrodes and X electrodes, widths of the Y and X electrodes are set narrow to reduce an intersection capacity of each electrode. This portion is tentatively called a thin line part. Thus, the Y electrode has a shape in which thin line parts and other electrode parts (hereinafter, referred to as pad parts) are alternately arranged in its extending direction. The X electrode is disposed between the adjacent Y electrodes. The X electrode extends in a vertical direction of the touch panel 101, and a plurality of the X electrodes are arranged in a horizontal direction. As in the case of the Y electrode, the X electrode has a shape in which thin line parts and pad parts are alternately arranged in its extending direction. In the following description of a shape of the pad part of the X electrode, it is presumed that a wiring line position (or thin line part of the X electrode) for connecting the X electrode to the detection wiring line is a horizontal center of the X electrode. The electrode shape of the pad part of the X electrode is thinner as the position of the X electrode is closer to the center of the adjacent X electrode, and thicker as the position of the X electrode is closer to center of the X electrode concerned. Thus, regarding an area of the X electrode between the two adjacent electrodes, for example, the electrodes XP1 and XP2, an electrode area of the pad part of the XP1 electrode is largest near the center of the XP1 electrode, and an electrode area of the pad part of the XP2 electrode is smallest near the center of the XP1 electrode. On the other hand, an electrode area of the pad part of the XP1 electrode is smallest near the center of the XP2 electrode, and an electrode area of the pad part of the XP2 electrode is largest near the center of the XP2 electrode. In a pad part shape between the two adjacent X electrodes, a shape of one X electrode is convex, while a shape of another X electrode is concave.

In FIG. 5B, an electrode shape of the pad part of the left side of the X electrode is convex, and an electrode shape of the right side is concave. However, shapes are not limited thereto. For example, an electrode shape of the right side of the X electrode may be convex, and an electrode shape of the left side may be concave. Electrode shapes of the left and right sides of the X electrode may be convex, and an electrode shape of the adjacent X electrode may be concave.

A shape of the Z electrode ZP is described below. In FIG. 5A, the Z electrode ZP is divided into a plurality of electrodes ZP by a plurality of slits parallel to the Y electrodes and a plurality of slits parallel to the X electrodes. In FIG. 5A, vertical positions of the slits parallel to the Y electrodes are disposed above the X and Y electrodes, and the vertical position above each X electrode is preferably disposed near a convex apex of the X electrode shape, or near a valley of the concave shape. The slit vertical position above the Y electrode is preferably disposed near a center of a width of the Y electrode. A plurality of slits parallel to the X electrode is disposed between the adjacent X electrodes. In this case, any interval of the slits parallel to the X electrode can be set appropriately. Preferably, however, the interval is close to an assumed size of a minimum contact surface of input means.

FIG. 6 illustrates a sectional shape of the touch panel 101 from points A to B of FIG. 5A. This sectional drawing illustrates only layers necessary for describing a touch panel operation. Each electrode of the touch panel 101 is formed on a transparent substrate. The following explanation is described from the proximal layer to the transparent substrate to the distal layer to the transparent substrate. First, an X electrode XP is formed in a place near the transparent substrate, and an insulating layer is formed to insulate X and Y electrodes. Then, a Y electrode YP is formed. The order of the X and Y electrodes XP and YP may be reversed. After the formation of the Y electrode YP, a pressure detection insulating layer is formed, and a Z electrode ZP and a protective layer are formed. The pressure detection insulating layer may be made of any transparent insulating material as long as a film thickness thereof changes when it is pressed by a touch operation. For example, the pressure detection insulating layer may be formed by using an elastic insulating material.

Next, referring to FIGS. 7A and 7B and 8A and 8B, a capacity change during a touch operation in the touch panel 101 according to the first embodiment of the present invention is described.

Figure 7A:
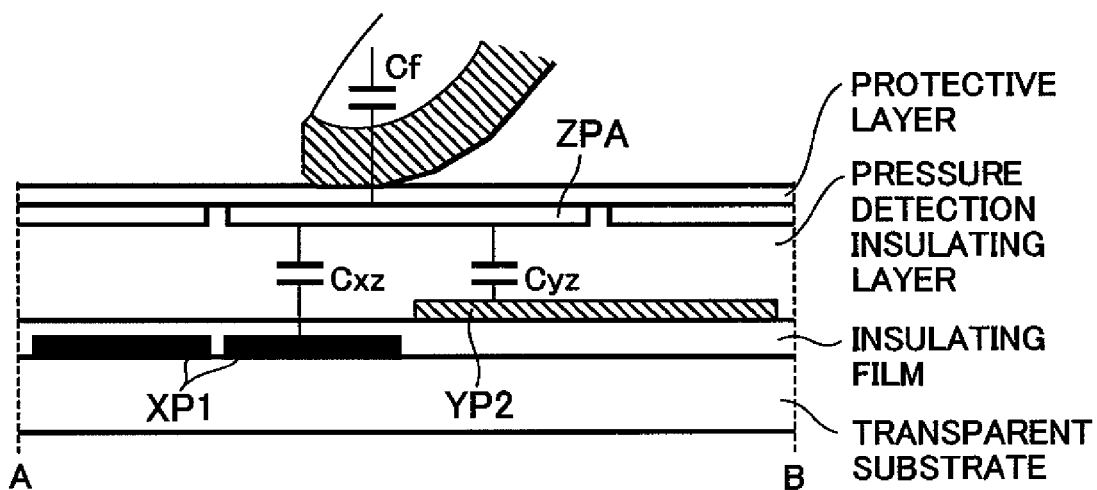
FIGS. 7A and 7B are schematic diagrams each illustrating a capacity change caused on an electrostatic capacity of the capacity detection electrode in the touch panel according to the embodiment of the present invention.
Figure 7B:
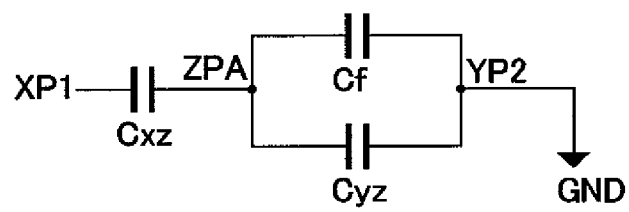

FIGS. 7A and 7B are schematic diagrams each illustrating a capacity change when input means of the touch operation is a conductor such as a finger. It is presumed that the pressure of the touch operation is too small to change a thickness of the pressure detection insulating layer. An electrode capacity of each electrode is a capacity combining a fringe capacity and an intersection capacity with an adjacent electrode and other parasitic capacity. In this case, it is presumed that only a parallel plate capacity with the Z electrode is focused, and no change occurs in other electrode capacities between a touch operation and no touch operation. A capacity between the Z electrode ZPA and the X electrode XP1 is Cxz, and a capacity between the Z electrode ZPA and the Y electrode YP2 is Cyz during no touch operation.

When the capacity detection unit 102 detects an electrode capacity of the X electrode XP1, the Y electrode YP2 is set to a GND potential in a reset state. Thus, in the case of the X electrode XP1, a combined capacity becomes a connected capacity of the capacities Cxz and Cyz in series because the Z electrode ZPA is in a floating state. In this case, a combined capacity Cxp of the X electrode is represented by the following expression.

$$Cxp = Cxz \cdot Cyz / (Cxz + Cyz) \quad (1)$$

When a finger touches by a touch operation, a finger electrostatic capacity component Cf is electrically connected to the Z electrode ZPA. An equivalent circuit of the combined capacity in this case is as illustrated in FIG. 7B, and a combined capacity Cxpf of the X electrode during a touch operation is represented by the following expression.

$$Cxpf = Cxz \cdot (Cyz + Cf) / (Cxz + Cyz + Cf) \quad (2)$$

The control calculation unit 103 calculates a difference between the XP1 electrode capacity Cxp when no touch operation is performed and the XP1 electrode capacity Cxpf when a touch operation is performed as a signal component of the XP1 electrode. A difference ΔCxp between electrode capacities based on presence/absence of a touch operation can be calculated from the expressions (1) and (2).

$$\Delta Cxp = Cxz^2 \cdot Cf / \{(Cxz + Cyz)(Cxz + Cyz + Cf)\} \quad (3)$$

As can be confirmed from the expression (3), the difference ΔCxp between the electrode capacities can be calculated as a signal component of the XP1 electrode by the control calculation unit 103 because the difference ΔCxp depends on the finger electrostatic capacity Cf.

Figure 8A:
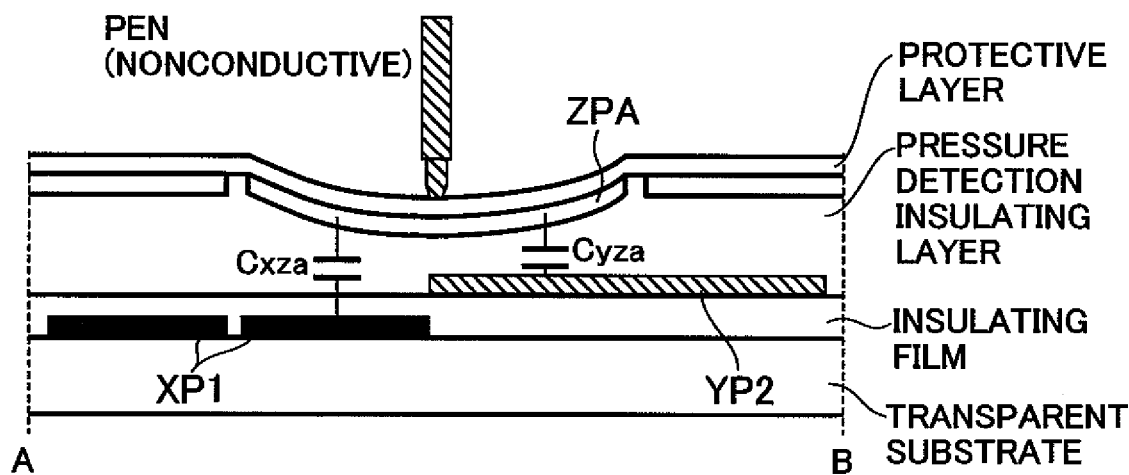
FIGS. 8A and 8B are schematic diagrams each illustrating a capacity change caused by a thickness change of a pressure detection insulating layer of the capacity detection electrode in the touch panel according to the embodiment of the present invention.
Figure 8B:
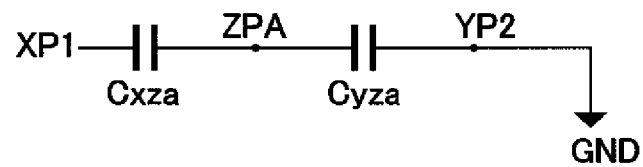

FIGS. 8A and 8B are schematic diagrams each illustrating a capacity change when the input means of the touch operation is nonconductive and the pressure of the touch operation changes a thickness of the pressure detection insulating layer.

A capacity of the XP1 electrode when no touch operation is performed can be represented by the expression (1) as described above referring to FIGS. 7A and 7B. Each of FIGS. 8A and 8B illustrates a case where the pressure of the touch operation causes the pressure detection insulating layer between the Z electrode ZPA and the capacity detection electrode to be thin. The following expression is established because a parallel plate capacity is inversely proportional to a thickness, where Cxza denotes a capacity between the Z electrode ZPA and the X electrode XP1 and Cyza denotes a capacity between the Z electrode ZPA and the Y electrode YP2.

$$Cxza > Cxz, \ Cyza > Cyz \quad (4)$$

When the capacity detection unit 102 detects an electrode capacity of the X electrode XP1, the Y electrode YP2 is set to a GND potential in a reset state. Thus, in the case of the X electrode XP1, a combined capacity is a serially connected capacity of the capacities Cxza and Cyza because the Z electrode ZPA is in a floating state. In this case, a combined capacity Cxpa of the X electrode is represented by the following expression.

$$Cxpa = Cxza \cdot Cyza / (Cxza + Cyza) \quad (5)$$

The control calculation unit 103 calculates a difference between the XP1 electrode capacity Cxp that is in the case without touch operation and the XP1 electrode capacity Cxpa that is in the case with touch operation as a signal component of the XP1 electrode. A difference ΔCxpa between electrode capacities based on presence/absence of a touch operation can be calculated from the expressions (1) and (5).

$$\Delta Cxpa = \{Cxz \cdot Cxza(Cyza - Cyz) + Cyz \cdot Cyza (Cxza - Cxz)\} / \{(Cxz + Cyz)(Cxza + Cyza)\} \quad (6)$$

As can be confirmed from the expressions (4) and (6), the difference ΔCxpa between the electrode capacities can be calculated as a signal component of the XP1 electrode by the control calculation unit 103 because the difference ΔCxpa can be detected by the capacity detection unit 102.

Thus, even in the case of the nonconductive input means, using the pressure detection insulating layer and the Z electrode ZP enables detection of the input coordinates based on a capacity change caused by a thickness change of the pressure detection insulating layer by pressing force.

Next, referring to FIGS. 9A to 9D and 10, a signal component of each electrode is described in the case that a position of a contact surface horizontally changes when the contact surface of the touch operation is small.

Figure 9A:
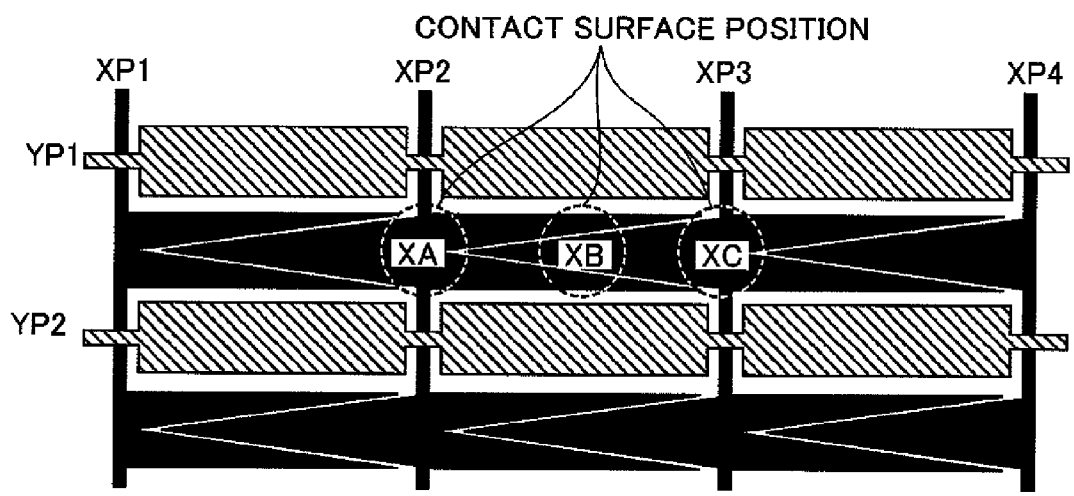
FIG. 9A is a schematic diagram illustrating the positions of contact surfaces on X electrode in X direction.
Figure 9B:
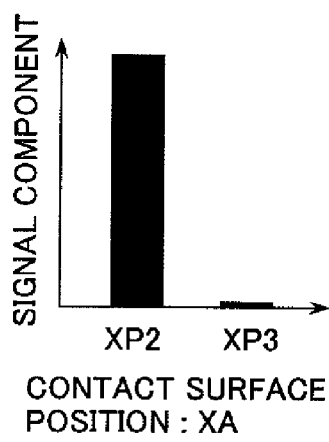
FIGS. 9B to 9D are graphs each illustrating a signal component of XP2 and XP3 in the case of the positions in FIG. 9A.
Figure 9C:
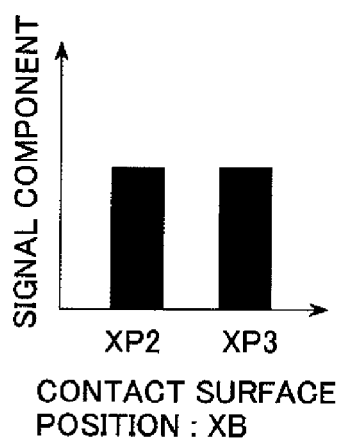
Figure 9D:
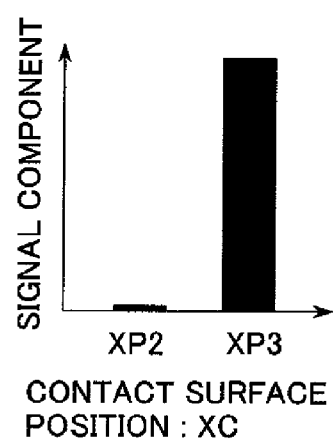

FIG. 9A illustrates a situation in which a position of the contact surface changes on the X electrode between the two adjacent X electrodes XP2 and XP3. XA is near the center of the electrode XP2, XB is near the intermediate position between the electrodes XP2 and XP3, and XC is near the center of the electrode XP3. FIG. 9A illustrates no Z electrode ZP for simplicity. FIG. 9B illustrates signal components of the electrodes XP2 and XP3 calculated by the control calculation unit 103 when the position of the contact surface is XA. Similarly, FIG. 9C illustrates signal components of the electrodes XP2 and XP3 when the position of the contact surface is XB, and FIG. 9D illustrates signal components when the position of the contact surface is XC. The electrostatic capacity Cf illustrated in FIGS. 7A and 7B and the capacity change between the Z electrode ZP and the capacity detection electrode illustrated in FIGS. 8A and 8B depend on an area of the contact surface. Thus, a signal component is large when an overlapped area between the capacity detection electrode and the contact surface is large, and small conversely when the overlapped area between the capacity detection electrode and the contact surface is small. In the position XA, an overlapped area is large between the contact surface and the electrode XP2, while there is almost no overlapping with the electrode XP3. Thus, as illustrated in FIG. 9B, a signal component of the electrode XP2 is large while that of the electrode XP3 is small. In the position XB, overlapped areas of the contact surface are almost equal between the electrodes XP2 and XP3. Thus, as illustrated in FIG. 9C, calculated signal components are almost equal between the electrodes XP2 and XP3. In the position XC, an overlapped area is large between the contact surface and the electrode XP3, while there is almost no overlapping with the electrode XP2. Thus, as illustrated in FIG. 9D, a signal component of the electrode XP3 is large, while that of the electrode XP2 is small. The control calculation unit 103 calculates the input coordinates of the contact surface of the touch operation by performing gravity center calculation using a signal component of each electrode. When almost equal signal components of the electrodes XP2 and XP3 are obtained as illustrated in FIG. 9C, a gravity center position comes between the electrodes XP2 and XP3, and the input coordinates can accordingly be calculated. On the other hand, if a signal component of one of the X electrodes is significantly large as illustrated in FIG. 9B or 9D, a gravity center position is near the X electrode having the large detected signal component, and accordingly the input coordinates can similarly be calculated.

Figure 10:
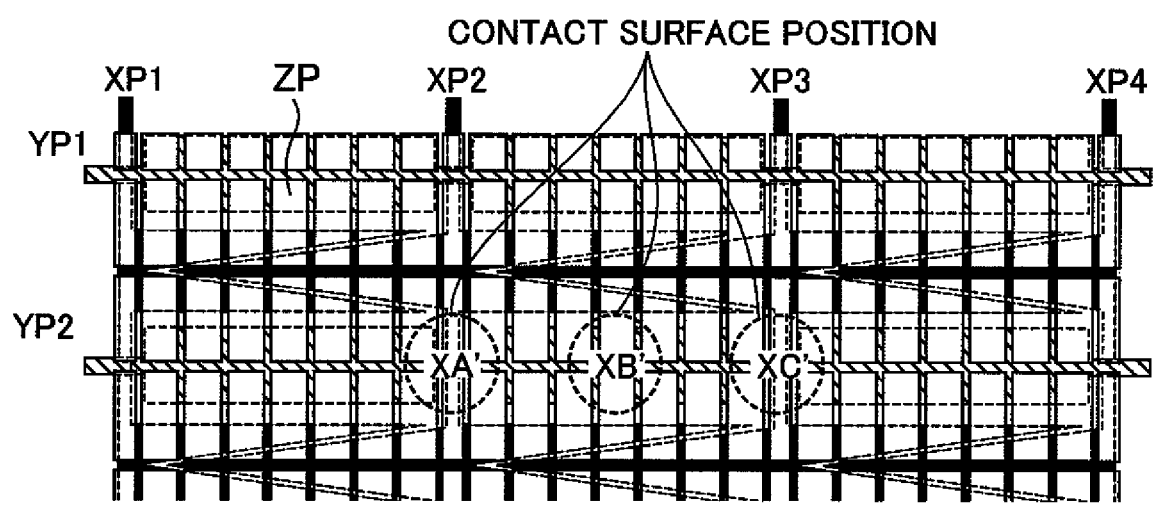
FIG. 10 is a schematic diagram illustrating the positions of contact surfaces on Y electrode in X direction.

FIG. 10 illustrates a situation in which the contact surface changes on the Y electrode as in the case of FIGS. 9A to 9D. For horizontal positions, XA, XB and XC of FIGS. 9A to 9D respectively correspond to XA', XB', and XC'. In FIG. 10, while the contact surface does not directly overlap the X electrode, the Z electrode overlapped by the contact surface overlaps the adjacent electrodes XP2 and XP3. Thus, a capacity change caused by contact on the Y electrode can also be detected by the adjacent X electrodes by capacity coupling via the Z electrode ZP.

As described above, using the electrode shape of the X electrode of the first embodiment of the present invention enables gravity center calculation even when an interval between the X electrodes is larger as compared with the contact surface, whereby a position can be detected with high accuracy. Thus, the number of electrodes can be reduced compared with the conventional electrode patterns by widening the interval between the X electrodes as compared with the area of the contact surface. Even when the electrode shape of the X electrodes is discrete by interposing the Y electrode, by disposing the Z electrode in an electrically floating state over the X and Y electrodes, the input coordinates of the X direction can be detected on the entire touch panel.

Next, referring to FIGS. 11A to 11D, a signal component of each electrode is described in the case that a position of the contact surface vertically changes when the contact surface of the touch operation is small.

Figure 11A:
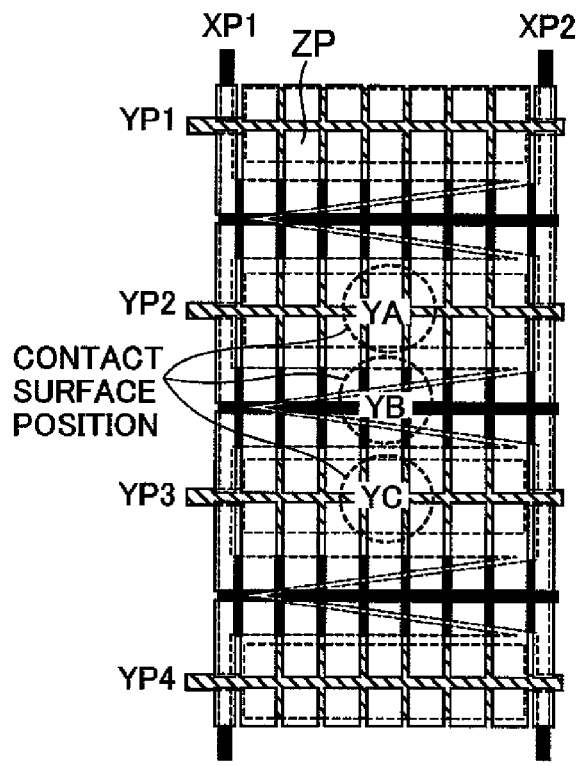
FIG. 11A is a schematic diagram illustrating the positions of contact surfaces on Y electrode in Y direction.
Figure 11B:
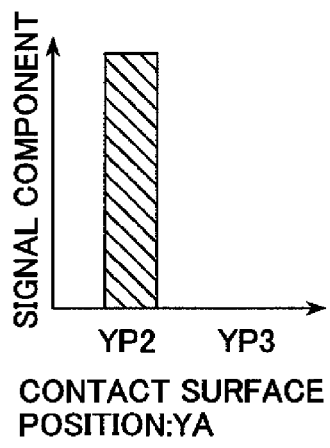
FIGS. 11B to 11D are graphs each illustrating a signal component of YP2 and YP3 in the case of the positions in FIG. 11A.
Figure 11C:
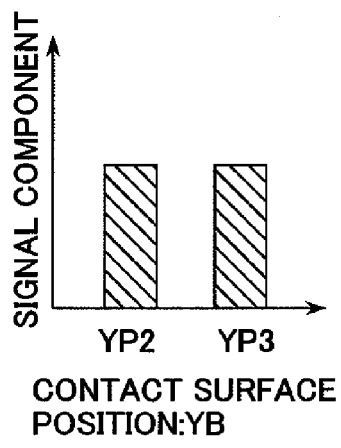
Figure 11D:
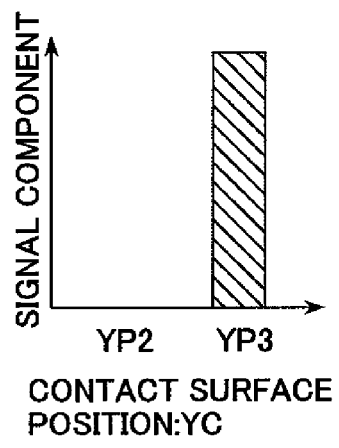

FIG. 11A illustrates a situation in which a position of the contact surface changes in a vertical direction between the two adjacent Y electrodes YP2 and YP3. YA is near a center of the electrode YP2, YB is near an intermediate position between the electrodes YP2 and YP3, and YC is near a center of the electrode YP3. It is only the Y electrode YP2 that overlaps the contact surface when the contact surface is in the position YA. Thus, a signal component detected by the control calculation unit 103 is only a signal component of the electrode YP2 as illustrated in FIG. 11B. Similarly, it is only the Y electrode YP3 that overlaps the contact surface when the contact surface is in the position YC. Thus, only a signal component of the electrode YP3 is detected by the control calculation unit 103 as illustrated in FIG. 11D. On the other hand, when the contact surface is on the X electrode as in the case of the position YB, the Z electrode ZP overlapping the contact surface intersects the adjacent Y electrodes. Thus, a capacity change caused by contact on the X electrode can be detected at the adjacent Y electrodes by capacity coupling via the Z electrode ZP. In the case of the position YB, a capacity change generated in the Z electrode ZP intersecting the electrode YP2 is substantially equal to that generated in the Z electrode ZP intersecting the electrode YP3. Thus, as illustrated in FIG. 11C, signal components obtained at the electrodes YP2 and YP3 are substantially equal to each other. As in the case of the input coordinate calculation for the X electrode, the control calculation unit 103 performs gravity center calculation by using a signal component of each electrode to calculate the input coordinates of the contact surface of a touch operation. When signal components of about equal levels are obtained at the electrodes YP2 and YP3 as illustrated in FIG. 11C, the control calculation unit 103 can calculate the input coordinates because a gravity center position is between the electrodes YP2 and YP3. On the other hand, when only a signal component of one Y electrode is obtained as illustrated in FIGS. 11B and 11D, the control calculation unit 103 can similarly calculate the input coordinates because a gravity center position is near a center of the Y electrode having a detected signal component.

As described above, even when the electrode shape of the Y electrodes of the first embodiment of the present invention is discrete by interposing the X electrode, the input coordinates of the Y direction can be detected on the entire touch panel by disposing the Z electrode in an electrically floating state over the adjacent X and Y electrodes. The input coordinates of a vertical direction in which the X electrode exists can be detected by using the above-mentioned Z electrode. Thus, the number of Y electrodes can be reduced. Vertical Y coordinates can be calculated based on gravity center calculation, enabling highly accurate detection of a position.

Figure 12:
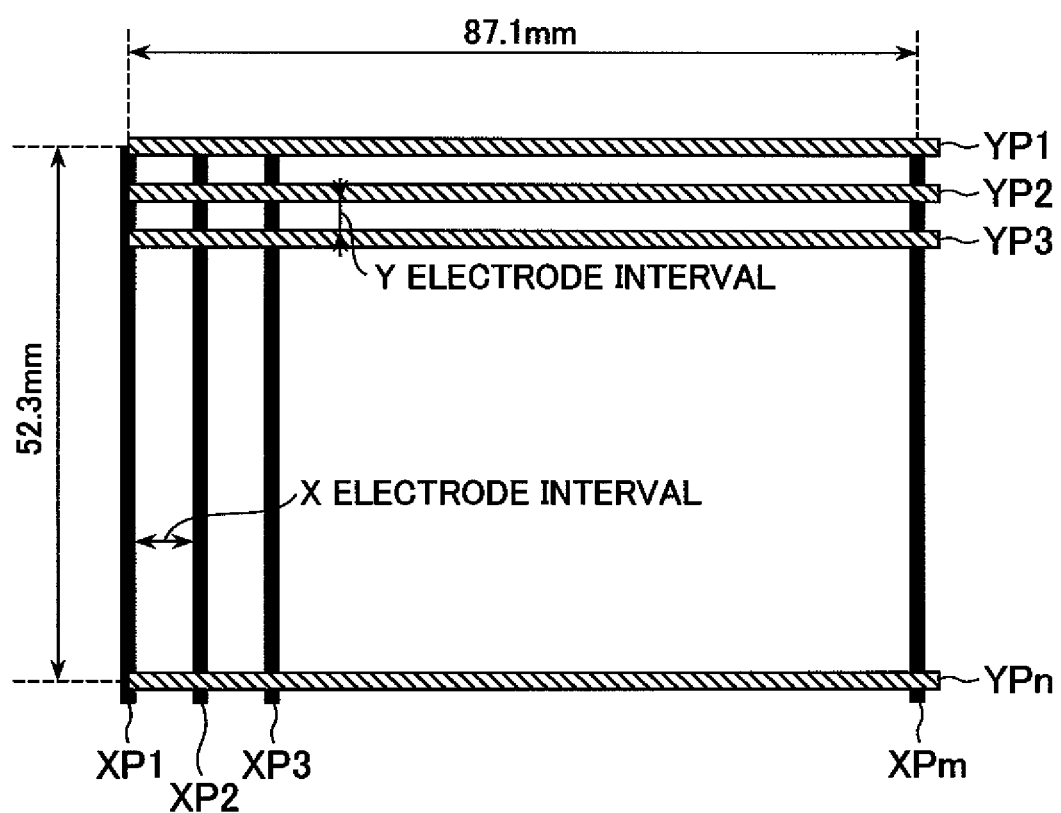
FIG. 12 illustrates an arrangement of the capacity detection electrodes in the touch panel.
Figure 13:
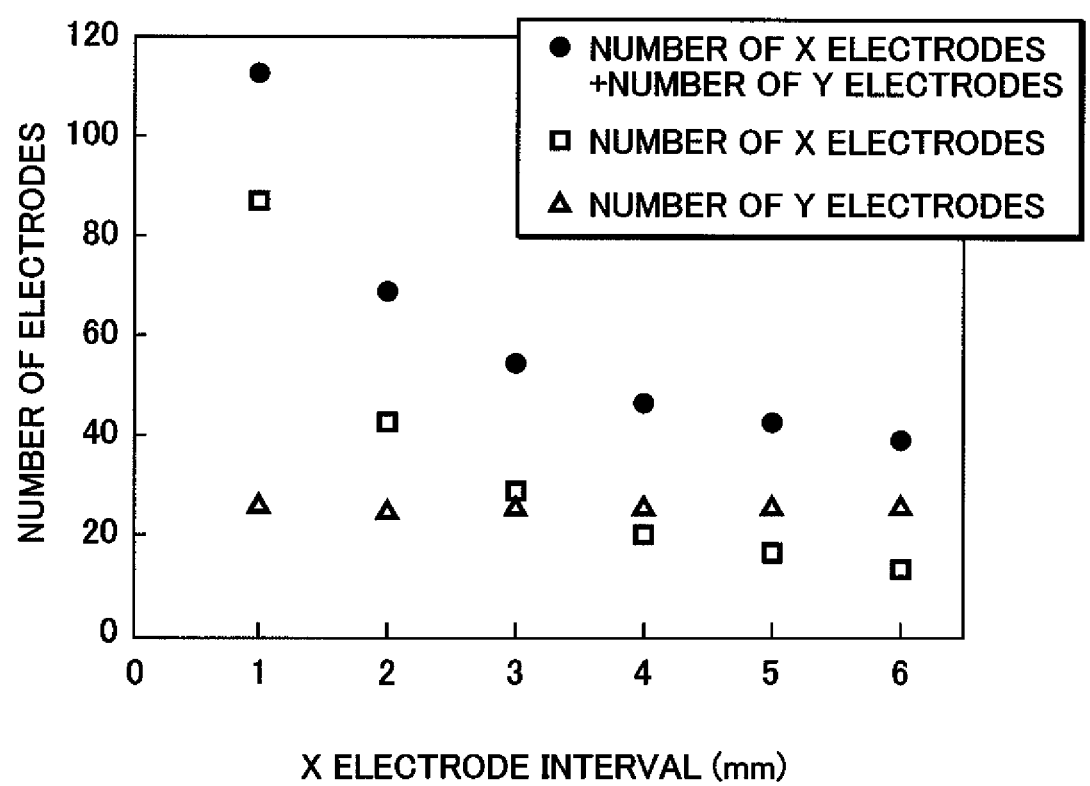
FIG. 13 is a graph illustrating dependence of the number of capacity detection electrodes on an X electrode interval.

In order to show the above-mentioned reduction effect of the number of capacity detection electrodes based on the electrode shapes of the X, Y and Z electrodes according to the first embodiment of the present invention, the inventors calculated the number of electrodes in a touch panel having a diagonal size of 4 inches (vertical and horizontal ratio is 3:4) as illustrated in FIG. 12. A minimum contact surface was assumed to be 1.0 mm in diameter, and an interval between the Y electrodes was assumed to be 2.0 mm. FIG. 13 is a graph illustrating the numbers of electrodes when an interval between the X electrodes is a parameter. Widening the interval between the X electrodes enables reduction of the X electrodes. For example, if the electrode interval is set to 6.0 mm, the number of capacity detection electrodes reduces to 100 while the number of electrodes is 139 in the conventional technology (X and Y electrodes are both arrayed at intervals of 1.0 mm).

Reducing the number of capacity detection electrodes according to the first embodiment of the present invention enables reduction of a frame size for laying detection wiring lines. The number of connections between the touch panel 101 and the capacity detection unit 102 is reduced, and hence reliability improvement can be expected. The number of capacity detection electrodes is reduced, and hence the number of terminals of the capacity detection unit can be reduced. Thus, the costs of manufacturing ICs (Integrated Circuits) can be reduced.

Figure 14:
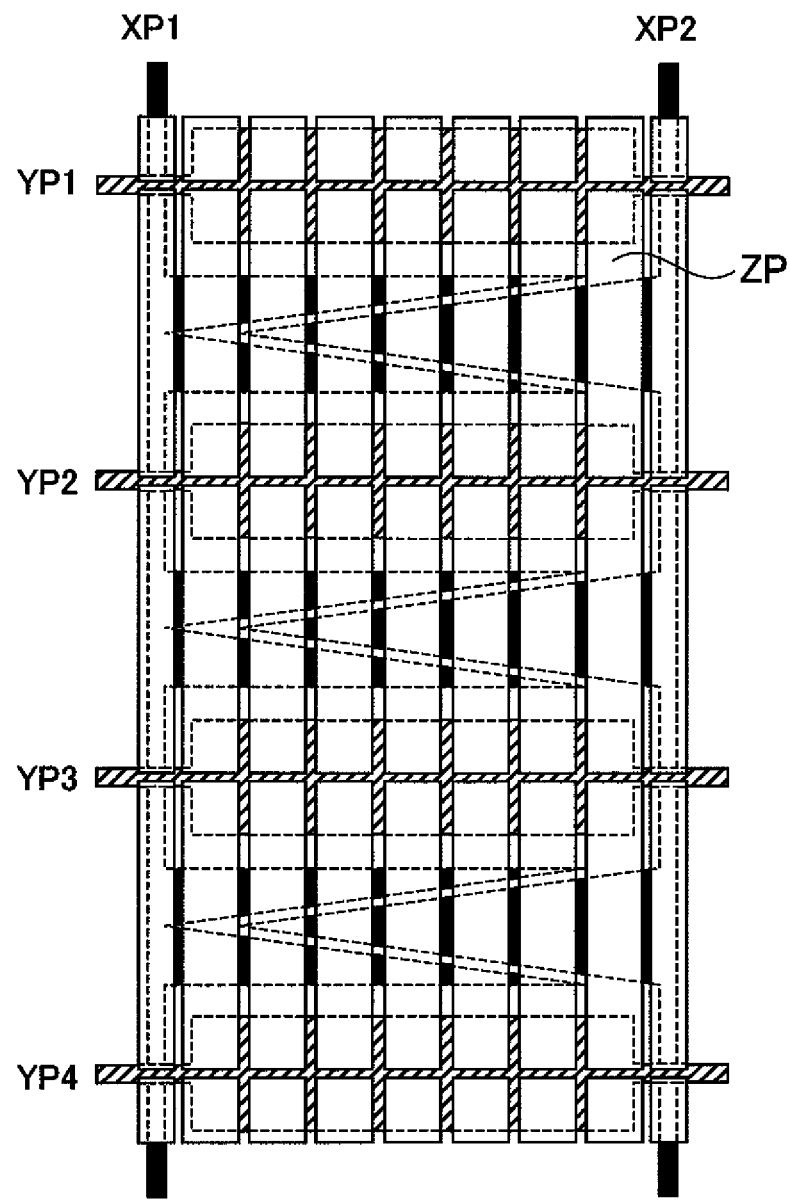
FIG. 14 is a schematic diagram illustrating another shape of a Z electrode according to the embodiment of the present invention.
Figure 15:
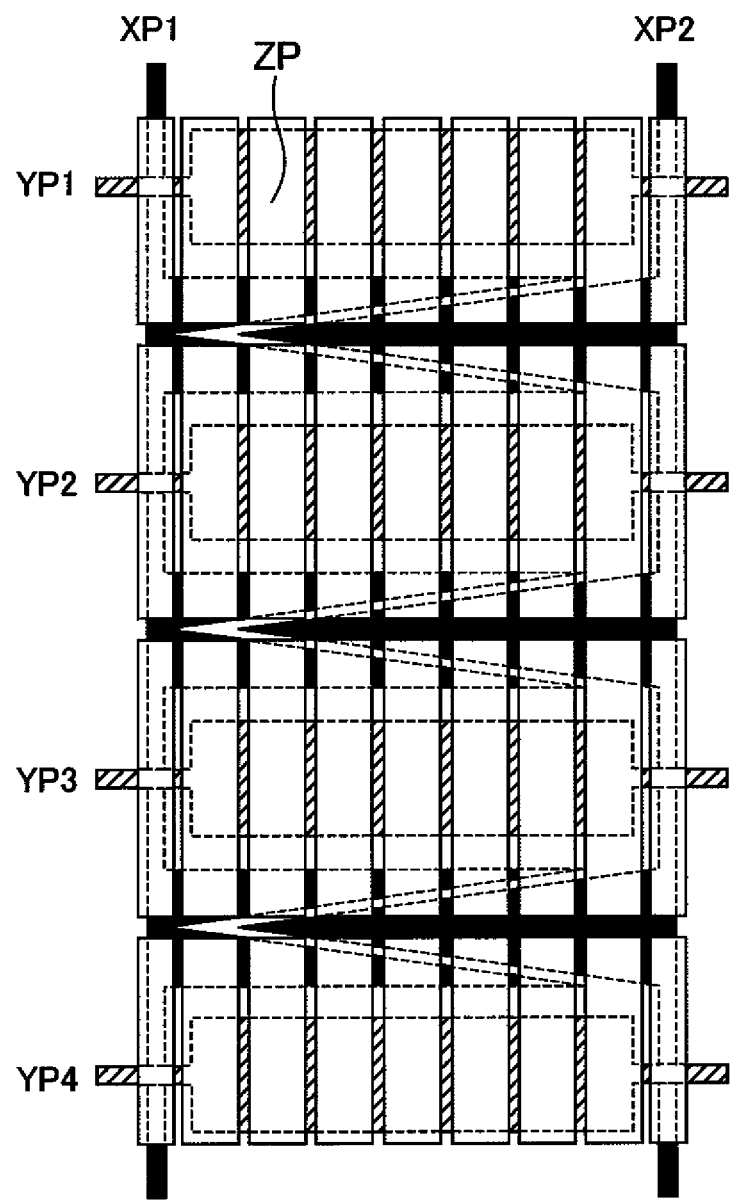
FIG. 15 is a schematic diagram illustrating another shape of the Z electrode according to the embodiment of the present invention.

Each of FIGS. 14 and 15 illustrates a case where the slit position of the Z electrode is changed. In the Z electrodes ZP of FIGS. 5A, 14 and 15, slits parallel to the X electrodes are similar while slits parallel to the Y electrodes are different. It is the same that Z electrodes intersect over the adjacent X and Y electrodes.

In FIG. 14, a slit parallel to the Y electrode is disposed near the center of each Y electrode. The same Z electrodes accordingly intersect over the adjacent X and Y electrodes. Thus, as in the case of FIG. 5A, the Y electrode can detect a capacity change on the X electrode by coupling, and the X electrode can reversely detect a capacity change on the Y electrode by coupling. As a result, the advantageous effects as the same as those of FIG. 5A can be expected.

In FIG. 15, a slit parallel to the Y electrode is disposed near a center of each X electrode. The same Z electrodes accordingly intersect over the adjacent X and Y electrodes. Thus, as in the case of FIG. 5A, the Y electrode can detect a capacity change on the X electrode by coupling, and the X electrode can reversely detect a capacity change on the Y electrode by coupling. As a result, the advantageous effects as the same as those of FIG. 5A can be expected.

Figure 16:
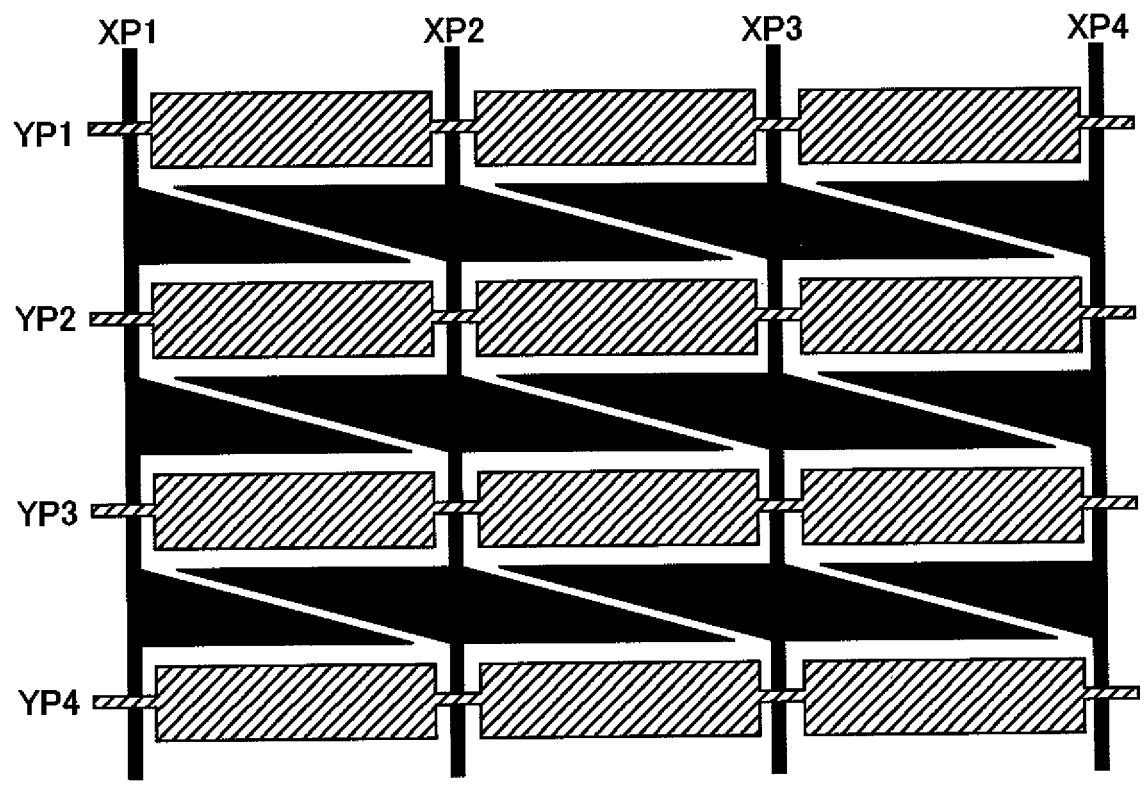
FIG. 16 is a schematic diagram illustrating another shape of an X electrode according to the embodiment of the present invention.

FIG. 16 illustrates a case where the shape of the X electrode illustrated in FIG. 5B is changed. In FIGS. 5B and 16, shapes of the Y electrodes are same. In FIG. 5B, the X electrode shapes are concave and convex, while the shape is substantially triangular in FIG. 16. In both of FIGS. 5B and 16, areas are smaller toward the center of the adjacent X electrode, and areas are larger toward a center of the X electrode concerned. Thus, the effects as the same as those of FIG. 5B can be expected. The shapes of the X electrodes are not limited to those of FIGS. 5B and 16. Any shapes can be employed as long as an area is smaller toward the center of the adjacent X electrode while an area is larger toward the center of the X electrode concerned.

As described above, according to the embodiment of the present invention, even when contact occurs on the touch panel by the nonconductive input means, a capacity change can be generated by changing distances between the capacity detection X and Y electrodes and the Z electrode thereon. Thus, the input coordinates can be detected by the electrostatic capacity coupling method. As a result, the resin stylus used for the resistive film method can be dealt with, and it becomes easier to replace with the resistive film type touch panel.

The electrode shapes are contrived so that the input position between the adjacent X electrodes can be calculated based on a signal ratio of capacity changes obtained from the two adjacent X electrodes, and it enables reduction of the number of X electrodes. The arrangement of Z electrodes is contrived, and it enables reduction of the number of Y electrodes. Thus, a frame width necessary for laying wiring lines from the detection electrodes to the input processing unit can be narrowed, improving designing. An increase in number of terminals of the input processing unit can be suppressed, and hence an electrostatic capacity coupling type touch panel that enables inexpensive and highly accurate input position detection can be realized. Moreover, the input coordinates can be accurately detected even by the input means of a small contact area, for example, a stylus, and hence the present invention can be applied to an application for character input.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device having an electrostatic capacity touch panel for detecting touch position coordinates in a display region by an electrostatic capacity coupling method, wherein the electrostatic capacity touch panel comprises:
    a plurality of X electrodes which extend in a first direction in a first plane, wherein each of the X electrodes is formed by thin line parts and pad parts which are alternately arranged in the first direction;
    a plurality of Y electrodes which extend in a second direction, which intersects the first direction, in a second plane, wherein each of the Y electrodes is formed by thin line parts and pad parts which are alternately arranged in the second direction;
    a plurality of Z electrodes which are in a third plane, and are at an electrically floating state with respect to each other;
    a first insulating layer which is located between the first plane and the second plane; and
    a second insulating layer which is located between the second plane and the third plane;
    wherein the first, second and third planes are planes different from one another;
    wherein each of the plurality of X electrodes and each of the plurality of Y electrodes intersect each other via the first insulating layer;
    wherein the pad part of the each of the plurality of X electrodes and the pad part of the each of the plurality of Y electrodes are disposed without overlapping each other in plan view;
    wherein each of the plurality of Z electrodes overlaps both an X electrode and a Y electrode which are adjacent to each other in plan view; and
    wherein a difference between a combined capacity between the X electrode and the Y electrode during a touch operation of the electrostatic capacity touch panel, and during a no touch operation of the electrostatic capacity touch panel, corresponds to a difference between a serially connected capacity of: a capacity between the Z electrode and the X electrode, and a capacity between the Z electrode and the Y electrode.

2. A display device according to claim 1, wherein the second insulating layer changes in thickness by pressing force of touch.

3. A display device according to claim 2, wherein the second insulating layer is formed of an elastic insulating material.

4. A display device according to a claim 1, wherein:
    the pad part of the each of the plurality of X electrodes extends to a vicinity of a thin line part of an X electrode adjacent to the each of the plurality of X electrodes;
    in plan view, in a shape of the pad part of the each of the plurality of X electrodes, an area is larger toward the thin line part of the X electrode and an area is smaller toward the thin line part of the adjacent X electrode.

5. A display device according to claim 4, wherein:
    in plan view, a width of the pad part of the each of the plurality of Y electrodes in the extending direction is constant with respect to the extending direction of the plurality of Y electrodes; and
    in plan view, the pad part of the each of the plurality of X electrodes and the pad part of the each of the plurality of Y electrodes are alternately disposed in the extending direction of the plurality of X electrodes.

6. A display device according to claim 5, wherein, in pad parts of two adjacent X electrodes, a shape of one pad part is convex, and a shape of another pad part is concave.

7. A display device according to claim 5, wherein, in pad parts of two adjacent X electrodes, shapes of both the pad parts are convex.

8. A display device according to claim 5, wherein the each of the plurality of Z electrodes is divided by a plurality of slits in the extending direction of the plurality of X electrodes, and by a plurality of slits in the extending direction of the plurality of Y electrodes.

9. A display device according to claim 8, wherein, in plan view, one slit of the each of the plurality of Z electrodes in the extending direction of the plurality of Y electrodes is disposed on the each of the plurality of Y electrodes and on the each of the plurality of X electrodes.

10. A display device according to claim 8, wherein, in plan view, one slit of the each of the plurality of Z electrodes in the extending direction of the plurality of Y electrodes is disposed on the each of the plurality of Y electrodes.

11. A display device according to claim 8, wherein, in plan view, one slit of the each of the plurality of Z electrodes in the extending direction of the plurality of Y electrodes is disposed on the each of the plurality of X electrodes.

12. A display device having an electrostatic capacity touch panel, wherein the electrostatic capacity touch panel comprises:
   a plurality of first electrodes extending in a first direction;
   a plurality of second electrodes extending in a second direction intersecting the first direction;
   a first insulating layer formed on the plurality of first electrodes and a second insulating layer formed on the plurality of second electrodes; and
   a plurality of third electrodes formed on the first and second insulating layers;
   wherein the plurality of first electrodes lie in a first plane, the plurality of second electrodes lie in a second plane, and the plurality of third electrodes lie in a third plane, the first, second and third planes being different from one another; and
   wherein a difference between a combined capacity between the first electrode and the second electrode during a touch operation and during a no touch operation corresponds to a difference between a serially connected capacity of: a capacity between the third electrode and the first electrode, and a capacity between the third electrode and the second electrode.

13. A display device according to claim 12, wherein the plurality of third electrodes are in electrically floating states with respect to each other, and formed so as to overlap each of the plurality of first electrodes and each of the plurality of second electrodes in plan view.

* * * * *